(12) United States Patent
Planý

(10) Patent No.: US 10,574,665 B2
(45) Date of Patent: Feb. 25, 2020

(54) SYSTEM AND METHOD FOR DETERMINING DEVICE PROXIMITY

(71) Applicant: Avast Software s.r.o., Prague (CZ)

(72) Inventor: Ondřej Planý, Prague (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 40 days.

(21) Appl. No.: 15/716,389

(22) Filed: Sep. 26, 2017

(65) Prior Publication Data

US 2018/0091523 A1   Mar. 29, 2018

Related U.S. Application Data (60) Provisional application No. 62/401,588, filed on Sep. 29, 2016.

(51) Int. Cl.

| | |
|---|---|
| *H04L 29/06* | (2006.01) |
| *H04W 4/02* | (2018.01) |
| *H04W 12/08* | (2009.01) |
| *H04W 12/06* | (2009.01) |
| *G06K 9/32* | (2006.01) |
| *G06K 9/18* | (2006.01) |
| *G06K 9/22* | (2006.01) |
| *H04W 12/00* | (2009.01) |
| *H04W 4/80* | (2018.01) |

(52) U.S. Cl.
CPC ............ *H04L 63/107* (2013.01); *G06K 9/183* (2013.01); *G06K 9/22* (2013.01); *G06K 9/3216* (2013.01); *H04L 63/08* (2013.01); *H04W 4/023* (2013.01); *H04W 12/003* (2019.01); *H04W 12/0023* (2019.01); *H04W 12/06* (2013.01); *H04W 12/08* (2013.01); *H04W 4/80* (2018.02); *H04W 12/00522* (2019.01)

(58) Field of Classification Search
CPC ......... H04L 63/107; H04L 63/08; G06K 9/22; G06K 9/183; G06K 9/3216; H04W 12/06; H04W 12/08; H04W 4/023; H04W 4/80
USPC .......................................................... 726/4
See application file for complete search history.

(56) References Cited

U.S. PATENT DOCUMENTS

| | | | |
|---|---|---|---|
| 8,782,136 B1 * | 7/2014 | Ho ........................ | H04W 4/21 709/204 |
| 9,160,835 B1 * | 10/2015 | Beckman ............ | H04M 1/7253 |

(Continued)

*Primary Examiner* — Alexander Lagor
*Assistant Examiner* — Sanchit K Sarker
(74) *Attorney, Agent, or Firm* — Husch Blackwell LLP (57) ABSTRACT

A computing device can initiate a pairing operation with mobile computing device. The computing device encodes a pairing secret into a displayable code for presentation. The size of the displayable code can be determined in accordance with a threshold distance and display parameters. The mobile computing device is positioned such that an image of the displayable code substantially fills a boundary whose size is determined according to a desired threshold distance, a focal length, and parameters of a sensor chip. The displayable code is decoded to reveal the pairing secret to the mobile computing device. The pairing secret is used to complete the pairing process with the computing device. Once pairing has been completed, the computing device can measure a signal strength between the computing device and the mobile computing device. The signal strength can be stored to be used for later authorization purposes.

16 Claims, 5 Drawing Sheets

(56) References Cited

U.S. PATENT DOCUMENTS

| | | | |
|---|---|---|---|
| 2007/0139321 A1* | 6/2007 | Takemoto | G06F 3/0325 345/87 |
| 2008/0253608 A1* | 10/2008 | Long | G06K 7/14 382/100 |
| 2011/0081860 A1* | 4/2011 | Brown | H04N 1/00347 455/41.3 |
| 2013/0029608 A1* | 1/2013 | Kuo | H04W 24/00 455/67.11 |
| 2016/0080895 A1* | 3/2016 | Peters | H04W 4/80 455/41.1 |
| 2016/0150066 A1* | 5/2016 | Yae | H04M 1/6091 455/41.2 |
| 2018/0091523 A1* | 3/2018 | Plan | G06K 9/183 |

* cited by examiner

SYSTEM AND METHOD FOR DETERMINING DEVICE PROXIMITY

CROSS-REFERENCE TO RELATED APPLICATIONS

This Application claims priority to U.S. Provisional Patent Application Ser. No. 62/401,588, filed on Sep. 29, 2016, entitled "Determining Device Proximity" the entire disclosure of which is incorporated herein by reference.

FIELD OF INVENTION

The present invention relates generally to computer systems, and more particularly, to secure authentication by determining the proximity of a device to a computer system.

BACKGROUND OF INVENTION

A common aspect of many computer systems and computer applications is ensuring that a user is authorized to use the computer system or application. A common way to authorize a user is to require the user to enter a correct password or username/password combination. However, the use of passwords is problematic. Users may choose passwords that are easy for the user to remember. However, often such passwords are names, birthdays, or single words. As a result, it can be relatively easy for a malicious party to either guess the correct password or apply brute force methods to determine a user's password. A user may be assigned, or choose a random string of characters and numbers as their password in order to make it harder for a malicious party to guess or attack the password. However, such passwords can be hard for the user to remember. Accordingly, a need exists for an improved approach for easy login among devices for which a user is authorized without reducing system performance.

SUMMARY OF INVENTION

One aspect of the present invention relates generally to a system and method for determining device proximity and using wireless pairing technology. Another aspect of the present invention relates generally to a system and method for authorizing use or access of a computing device and/or an application or information on the computing device. A displayable code associated with a paring secret may be implemented in pairing a first device, such as a source computing device, and a second device, such as a mobile computing device.

One embodiment of the present invention is directed to a computer-implemented method wherein a program is executed on a computer system, which can include a pair of computing devices, or multiple computing devices, connected through a wireless or network connection. In a pairing operation, the method can include the step of creating the displayable code. The pairing secret can be encoded into the displayable code. The pairing secret and displayable code may be created or generated by one of the computing devices, such as a source computing device. The displayable code may be presented or otherwise displayed on a display of the source computing device. The size of the displayable code can be determined in accordance with a threshold distance and display parameters. The mobile computing device may have installed thereon an application for determining certain parameters of a camera associated with the mobile computing device. Such parameters may include a focal length, dimensions of a sensor chip, and a display resolution of the camera. The parameters may be analyzed and used to configure the size, shape and/or position of a boundary, which may be a rectangle for example, on a display of the mobile computing device. The rectangle may be oriented and displayed over an image of the displayable code obtained by the camera. In response to determining the displayable code substantially fills the rectangle, the displayable code can be decoded, by the mobile computing device, to decrypt or other decode the pairing secret to the mobile computing device. The pairing secret can be used to complete the pairing process of the mobile computing device and the source computing device. Wireless pairing completion information can be communicated between the mobile computing device and the source computing device. Once pairing has been completed, the source computing device can measure a signal strength in a threshold distance, which can be stored to be used for automatic authorization purposes at a later time.

Another embodiment of the present invention relates to a non-transitory computer readable storage medium having a program stored thereon that is configured for determining device proximity. The program on the computer readable storage medium initiates a proximity initialization application for configuring a position of the mobile computing device associated with a camera module. Parameters for the camera can be determined by the proximity initialization application or other application. Based on the parameters, a determination can be made as to whether the displayable code adequately presented in the rectangle area. The size of the rectangle for display on the mobile computing device can be configured based on various parameters, including but not limited to the parameters of the camera. The displayable code image created encoded with the pairing secret can be presented on a display as a certain size and may be overlaid by the rectangle of the mobile computing device. The mobile computing device can scan and decode the displayable code image when the displayable code fills a certain area of the rectangle. Upon the pairing, the pairing completion information can be sent to the source computing device. The source computing device can send an acknowledgment back to the mobile computing device.

A further aspect of the present invention is generally directed to a system and method for authorizing use or access of a computing device and/or an application or information on the computing device. In response to the completion of a pairing of a first device and a second device, a signal strength between the first and second devices can be measured. The measured signal strength may be stored as a threshold value for later use. Subsequently, the signal strength between the first and second devices can be re-measured, and it may be determined whether the subsequently measured signal strength is at least equal to or greater than the threshold value. In response to determining that the subsequently measured signal strength is at least equal to or greater than the threshold value, use or access of a computing device and/or an application or information thereon may be authorized.

BRIEF DESCRIPTION OF THE DRAWINGS

For a better understanding of the inventive subject matter, reference may be made to the accompanying drawings in which.

DETAILED DESCRIPTION OF INVENTION

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the foam of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar tennis are to be associated with the appropriate physical-quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
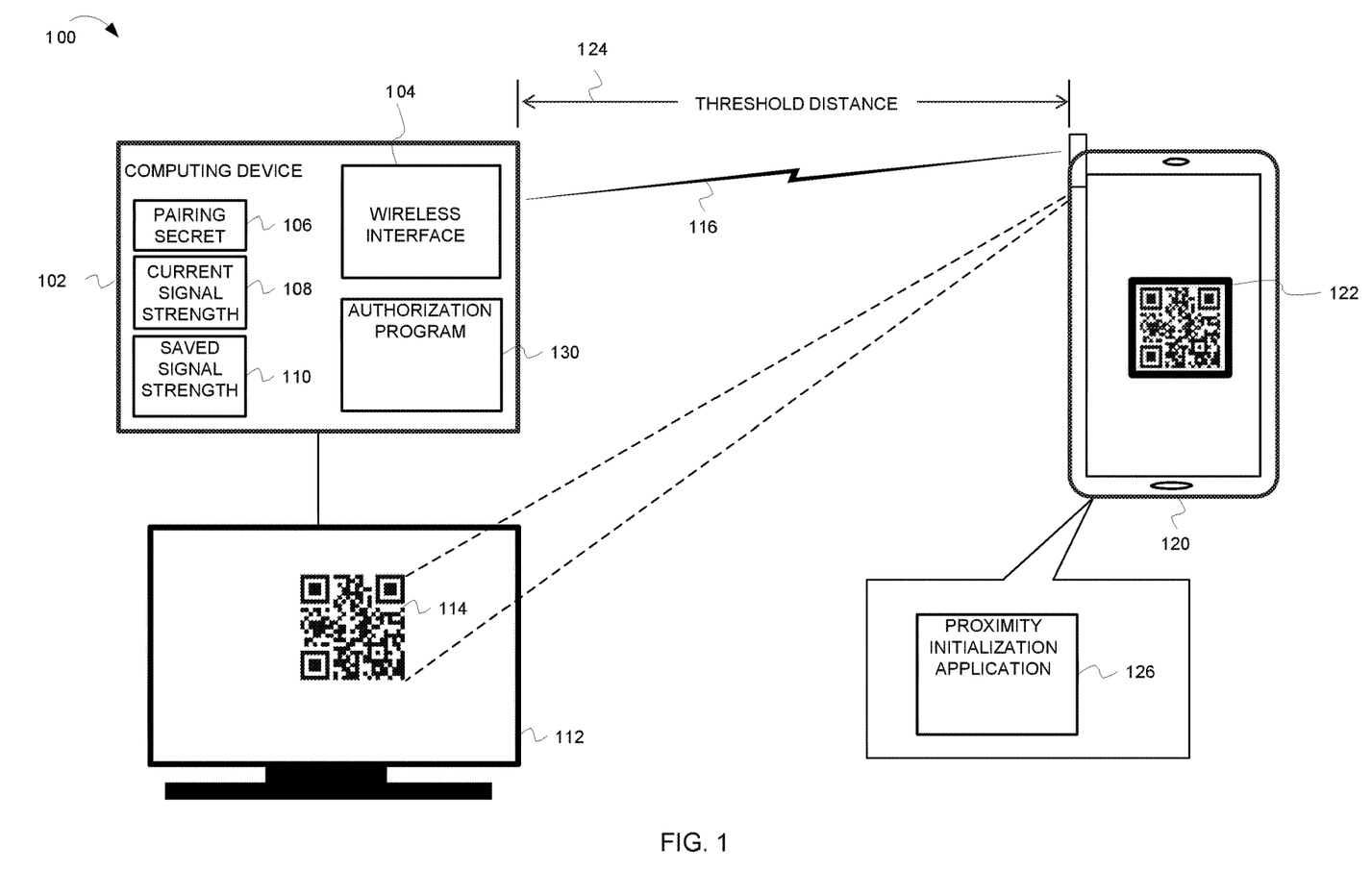
FIG. 1 is a block diagram illustrating a system to determine device proximity in accordance with one embodiment of the present invention.

FIG. 1 is a block diagram illustrating a system 100 to determine device proximity in accordance with one embodiment of the present invention. In some aspects, system 100 can include a source computing device 102 and a mobile computing device 120. The mobile computing device 120 can be, for example, a smart phone, a laptop computer, a tablet computer, or any other computing device now known or hereafter developed. In some embodiments, the mobile computing device 120 may have at least one of a processor, a display, a wireless communication interface, a network interface, a sensor or a camera.

The computing device 102 can be any type of computing device. The computing device 102 can be, for example, a desktop computing device, a server computer, a client computer, a set-top box, a laptop computer, a tablet computer, an embedded computer system, or any other computing device now known or hereafter developed. In some embodiments, the computing device 102 may be a mobile computing device, such as a smart phone or the like. In one embodiment, the computing device 102 includes at least one processor, a wireless interface 104, and access to a display 112. Wireless interface 104 can be any type of wireless interface. In some aspects, wireless interface 104 is a Bluetooth™ interface. The Bluetooth™ technology can provide a data interface solution between devices. For initiating a data interface, the system may require a "pairing" procedure. However, the wireless interface 104 can be any type of device capable of providing wireless communication to computing device 102, such as Wi-Fi™ devices, WiMAX™ interfaces or other types of wireless interfaces.

The computing device 102 can be configured with an authorization program 130. Authorization program 130 can operate to lock or unlock computing device 102 for use. Authorization program 130 can be a separate program on computing device 102, or it can be part of an application that executes on computing device 102. When part of an application, it can be used to unlock or lock the application for use.

In some aspects, source computing device 102 can initiate a pairing operation with mobile computing device 120. The source computing device 102 can create a pairing secret 106, and encode the pairing secret 106 into a displayable code 114, which may, for example, be a Quick Response (QR) code, a cryptography code, a bar code, or any other suitable two-dimensional code, for presentation on display 112. The size of the displayable code 114 can be determined in accordance with a predetermined or configurable threshold distance 124 value between computing device 102 and mobile computing device 120, and display parameters. A proximity initialization application 126 on the mobile computing device 120 can be used to assist a user in positioning the mobile computing device 120 at the threshold distance 124 by determining operational parameters of a camera (not shown) on mobile computing device 120 and determining a size of a boundary, such a bounding rectangle 122, according to the operational parameters of the camera and the threshold distance 124. While the boundary is described as having a rectangular shape in one embodiment, it will be appreciated that the boundary may be of any suitable shape, including but not limited to a circle, an oval, a polygon, or any other shape formed of multiple sides, curves or curvilinear sections forming a defined area therein. The user then moves the mobile computing device 120 to the threshold distance 124 by framing the displayable code 114 to fit in the bounding rectangle 122 such that the displayable code 114 fills the bounding rectangle 122. The displayable cryptography code 114 can be scanned and decoded to decrypt the pairing secret 106 to the mobile computing device 120. The pairing secret 106 can then be used to complete the pairing process with the computing device 102.

Once pairing has been completed, the computing device 102 can measure a current signal strength 108 of a signal between the computing device 102 and the mobile computing device 120. The measured current signal strength 108 value can be stored to a saved signal strength 110 as a saved signal strength of the current signal strength 108 for a reference for later use.

Further details on the operation of computing device 102 and mobile computing device 120 are provided below with reference to FIGS. 2 and 3.

Figure 2:
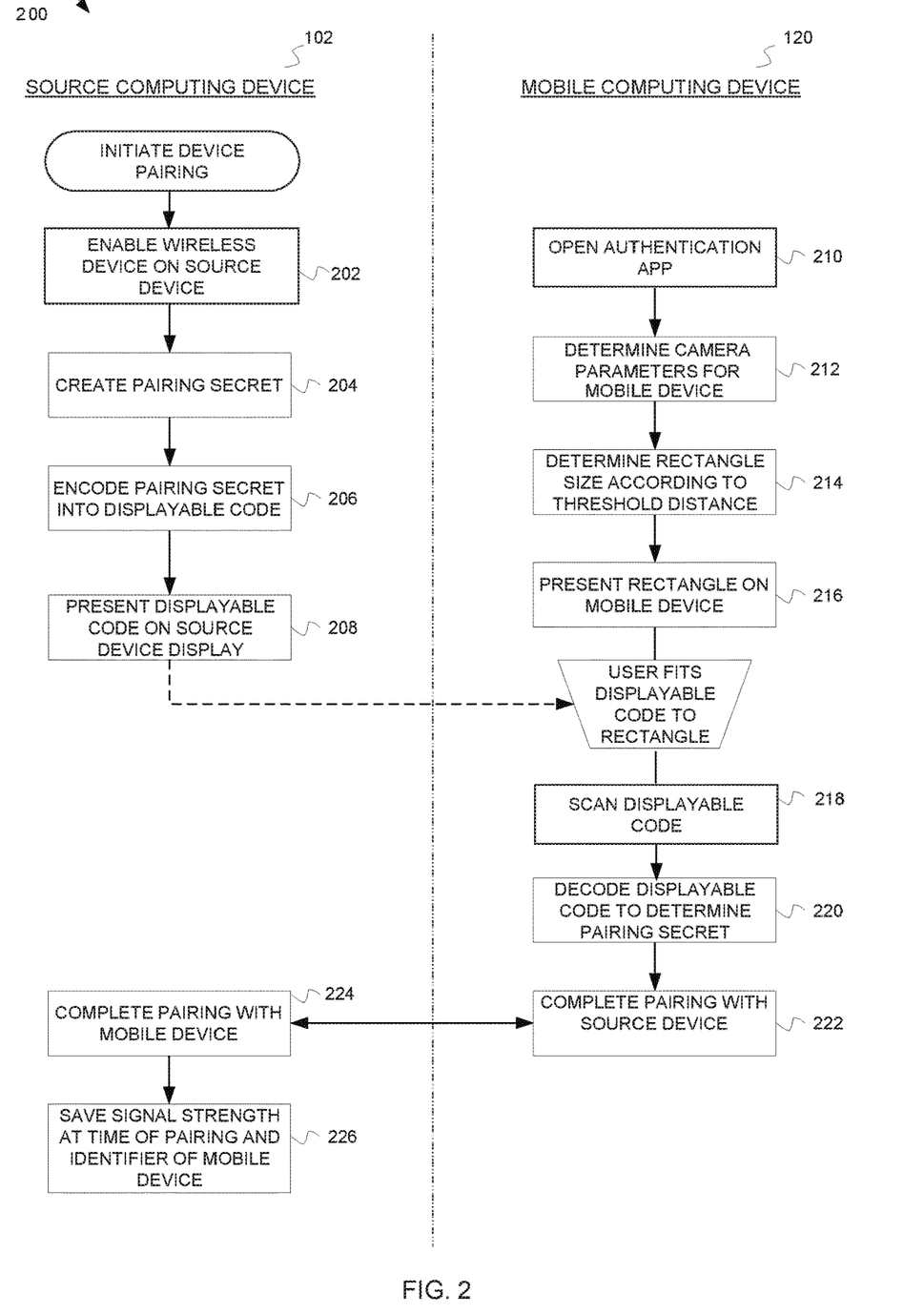
FIG. 2 is a flow chart illustrating operations of a method for initializing a system for determining device proximity in accordance with one embodiment of the present invention.

FIG. 2 is a flow chart 200 illustrating operations of a method for initializing a system for determining device proximity in accordance with one embodiment of the present invention. In one embodiment, the method illustrated in FIG. 2 can begin when a computing device 102 initiates a pairing operation with a mobile computing device 120. In other embodiments, the method may begin when mobile device 120 initiates a pairing operation with computing device 102.

At block 202, the computing device 102 enables its wireless interface if the wireless interface is not already enabled. In some aspects, the computing device 102 may initiate a Bluetooth™ interface.

At block 204, the computing device 102 determines a pairing secret. The pairing secret is a secret value known only to the computing device 102.

At block 206, the computing device 102 encodes the pairing secret into a displayable code. In some aspects, the pairing secret can be encoded into a QR (Quick Response) code. However, the inventive subject matter is not limited to QR codes, and in alternative embodiments, the pairing secret can be encoded into a different type of displayable code. For example, the pairing secret can be encoded into a bar code or a different type of two-dimensional bar code.

At block 208, the displayable code is presented on a display 112 at a predetermined or configurable physical size (x). In order to set a correct size of the displayable code, the physical dimensions of the display 112 can be obtained. For example, in some aspects, the physical dimensions of the display 112 can be determined according to Extended Display Identification Data (EDID) on the computing device 102. The pixel size can then be determined based on the display resolution and the physical dimensions of the display 112.

In some aspects, the operations of blocks 202-208 are executed on the computing device 102. In one embodiment, the operations of blocks 210-222 can be executed on a mobile computing device 120. At least some of the operations of blocks 210-222 can be executed in parallel or generally simultaneously with the operations of blocks 202-208. However, such parallel or simultaneous operation is not a requirement.

At block 210, a proximity initialization application 126 can be opened on mobile computing device 120. In some aspects, computing device 102 may display instructions along with the displayable code regarding opening and operating the proximity initialization application on the mobile device 120.

At block 212, the proximity initialization application 126 can analyze camera parameters for a camera module on the mobile computing device 120. In one embodiment, the camera parameters can include the x and y dimensions of a sensor chip for the camera (referred to as Dxmax and Dymax), and a focal length (f). In addition, the proximity initialization application 126 can determine a display resolution (Rx and Ry) for a display on the mobile computing device 120. Further, the proximity initialization application 126 is configured such that it knows the size (x) used to present the displayable code 114 on the display 112 of computing device 102. In some aspects, the size can be encoded into the displayable code along with the pairing secret.

At block 214, the proximity initialization application 126 can determine a rectangle size (s) for the display on the mobile computing device 120. The rectangle size (s) for the displayable code 114 may also be determined. In the case where the displayable code is a QR code, s represents the size of the rectangle in pixels or other unit of measurement. In the case where the displayable code is a not square, such as a bar code or other shape of code, then s represents the size of the longest side of the displayable code. In some aspects, the rectangle size for a given threshold distance (c) can be determined by the formula:

$$S = \frac{f \cdot x \cdot R_y}{D_{ymax}(c - f)} \quad (1)$$

In some aspects, the value for the threshold distance can be a predetermined value that is known to both the computing device 102 and the mobile computing device 120. In another embodiment, the threshold distance can be configured, either by the proximity initialization application 126 or an application on computing device 102.

At block 216, the rectangle is presented on a display of the mobile computing device 120. In one embodiment, when the camera of the mobile computing device 120 is activated, then the image produced by the camera can be presented on the mobile computing device 120 display, with the rectangle 122 overlaying the image.

After presentation on the display, the user of the mobile computing device 120 can position the mobile computing device 120 such that the camera lens is facing the display of the computing device 102, and an image of the displayable code 114 presented on the display 112 substantially fills in the rectangle 122 presented on the display of the mobile computing device 120. In one embodiment, the user can be prompted to position the mobile computing device 120 to cause the image of the displayable code to substantially fill the rectangle 122.

In response to determining that the image of the displayable code substantially fills the rectangle 122, at block 218 the mobile computing device 120 can scan the displayable code 114. Various parameters may be used to determine if the displayable code 114 substantially fills the rectangle 122. For example, another embodiment, the rectangle 122 may be substantially filled if it is determined that 90% or more of the rectangle's area is filled with the image of the displayable code 114, without exceeding the boundaries of the rectangle 122. Those of skill in the art will appreciate that other fill percentage thresholds could be chosen depending on the desired accuracy.

In another embodiment, two concentric rectangles can be presented on the display of the mobile device, including a smaller rectangle and a larger rectangle. The smaller rectangle can represent a minimum fill percentage of the rectangle calculated at block 214, and the larger rectangle can represent a maximum overfill percentage of the rectangle calculated at block 214. The proximity initialization application 126 can then determine if the boundaries of the image of the displayable code are between the smaller and larger rectangles.

At block 220, the displayable code 114 is decoded by the mobile computing device 120 to determine or decode the pairing secret embedded in the displayable code 114. For example, if the mobile computing device 120 scanned a QR code, the proximity initialization application 126 can transfer the QR code image data to the original pairing secret 106 data.

At block 222, the mobile computing device 120 completes the pairing with the computing device 102. In one embodiment, the mobile computing device 120 can execute the pairing process by a Bluetooth pairing application or other means which can be included in the proximity initialization application 126.

At block 224, the computing device 102 detects that the mobile computing device 120 has completed the pairing (e.g., by sending back the shared secret), and in response, the computing device 102 completes the pairing.

At block 226, the computing device 102 can save the signal strength at the time of the pairing is completed. In some aspects, the computing device 102 saves an RSSI (Received Signal Strength Indicator) value to the system memory unit or a network connected server (not shown). Other types of signal strength indicators could be saved, and are within the scope of the inventive subject matter. For example, an RCPI (Received Channel Power Indicator) value could be used.

In addition to the signal strength value, the computing device 102 can also save an identifier associated with the mobile computing device 120. For example, the MAC (Media Access Control) address associated with the mobile computing device 120 can be saved and associated with the saved signal strength indicator. Other types of device identifiers could be used instead of the MAC address and such identifiers are within the scope of the inventive subject matter.

Figure 3:
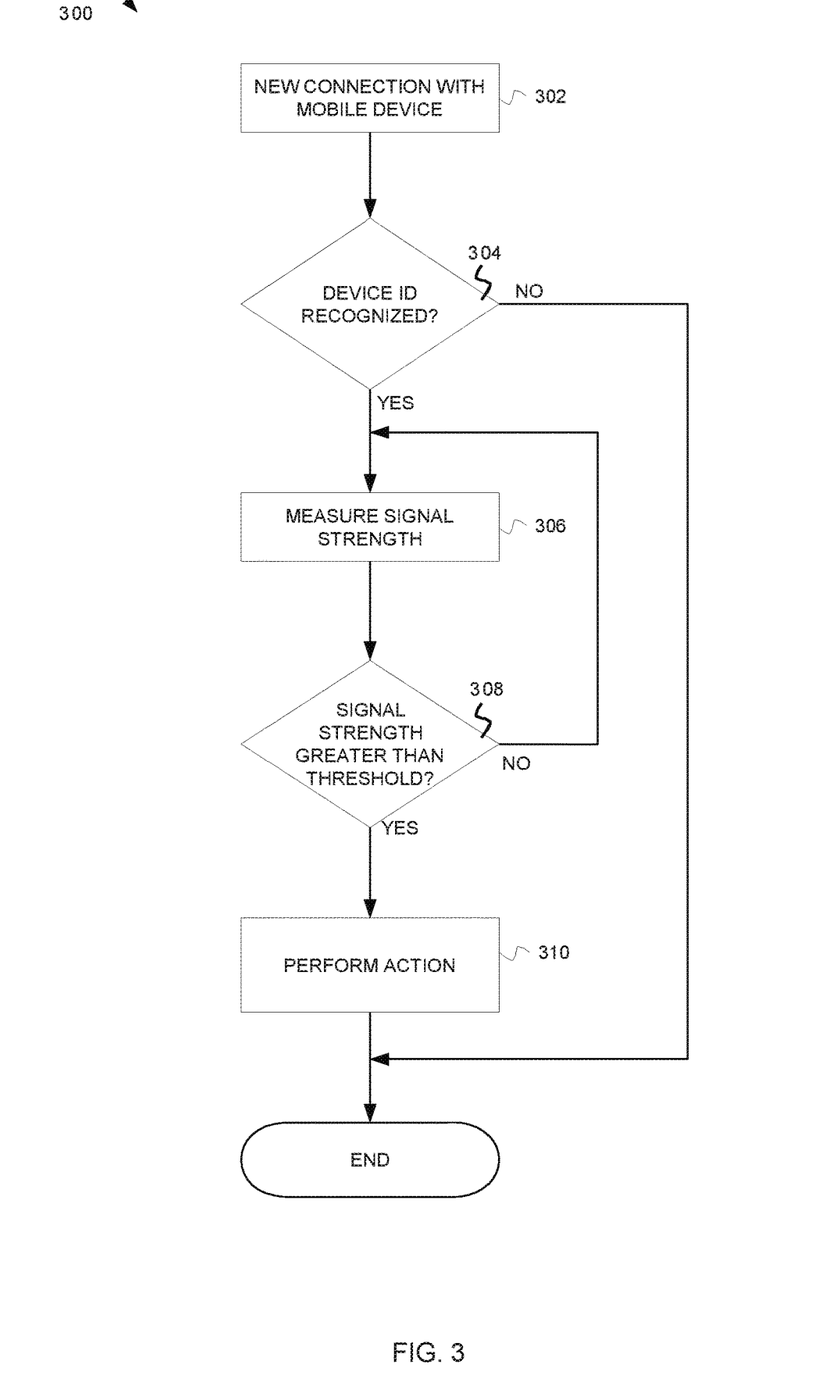
FIG. 3 is a flow chart illustrating operations of a method for using device proximity to authorize use of a computing device or application in accordance with one embodiment of the present invention.

FIG. 3 is a flow chart 300 illustrating operations of a method for using device proximity to authorize use of a computing device or application in accordance with one embodiment of the present invention.

At block 302, the computing device 102 may pair with a mobile computing device 120 via a wireless interface. In some aspects, the computing device 102 pairs with mobile computing device 120 via a Bluetooth interface.

At block 304, the computing device 102 determines if a device identifier for the mobile device 120 is recognized. For example, the computing device 102 can check to determine if a saved threshold signal strength has been previously associated with the device identifier. In some aspects, the signal strength can be an RSSI value and the device identifier is a MAC address. If the device identifier for the mobile device 120 is not recognized, the method ends. Otherwise, the method proceeds to block 306.

At block 306, the computing device 102 measures the signal strength of the signal transmitted by the mobile computing device 120. In some aspects, the computing device 102 measures an RSSI.

At block 308, the computing device 102 determines if the signal strength is at least equal to or greater than a predetermined threshold value. In some aspects, the predetermined threshold can be a saved signal strength associated with the device identifier that was determined and saved during prior execution of the method illustrated in FIG. 2. The signal strength can be represented by an RSSI value.

If the signal strength is at least equal to or greater than the threshold value, then the computing device 102 can presume that the mobile computing device 120 is within a threshold distance. The method then proceeds to block 310 to perform a predetermined or configurable action. For example, the computing device 102 or mobile computing device 120 may authorize the user on the computing device 102. If the signal strength is less than the predetermined threshold value, then the method can assess the signal strength at a later time by returning to block 306.

Figure 4:
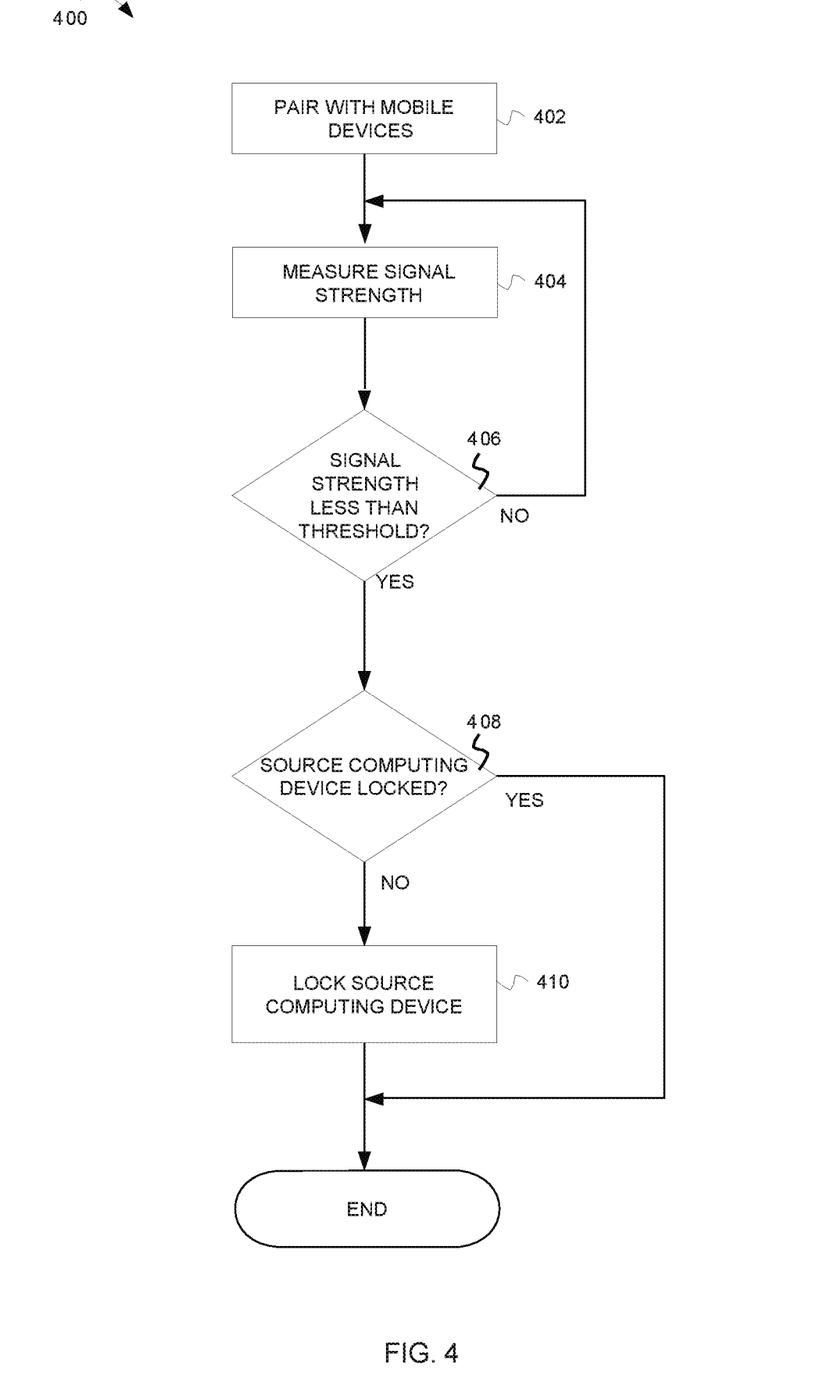
FIG. 4 is a flow chart illustrating operations of a method for using device proximity to lock a computing device in accordance with one embodiment of the present invention.

FIG. 4 is a flow chart 400 illustrating operations of a method for using device proximity to lock a computing device 102 in accordance with one embodiment of the present invention.

At block 402, a computing device 102 pairs with a mobile computing device 120 via a wireless interface. In some aspects, computing device 102 pairs with mobile computing device 120 via a Bluetooth interface or other means.

At block 404, the computing device 102 measure a current signal strength 108 of a signal between the computing device 102 and the mobile computing device 120. The signal strength may be measured through a wireless Bluetooth receiver installed in the system devices. The signal strength can be represented such as an RSSI or RCPI value.

At block 406, the computing device 102 determines if the signal strength is less than a predetermined threshold value. In some aspects, the predetermined threshold can be a saved signal strength that was determined and saved during prior execution of the method illustrated in FIG. 2. The signal strength can be represented by an RSSI value.

If the signal strength is less than the threshold value, then the method proceeds to block 406. If the signal strength is greater than the predetermined threshold value, then the method can continue assess the signal strength by returning to block 404.

At block 408, a check is made to determine if the computing device 102 or an associated application is currently locked. If the computing device 102 is currently locked, then the method ends. If the computing device 102 is not locked, then the method proceeds to block 410, where the computing device 102 or associated application is locked (i.e., de-authorized).

The above discussion has been presented in the context of authorizing a computer or application. It should be noted that the systems and methods described herein can be adapted for use in other contexts besides authorization where it is desirable to associate a signal strength with a distance from a computing device 102.

Figure 5:
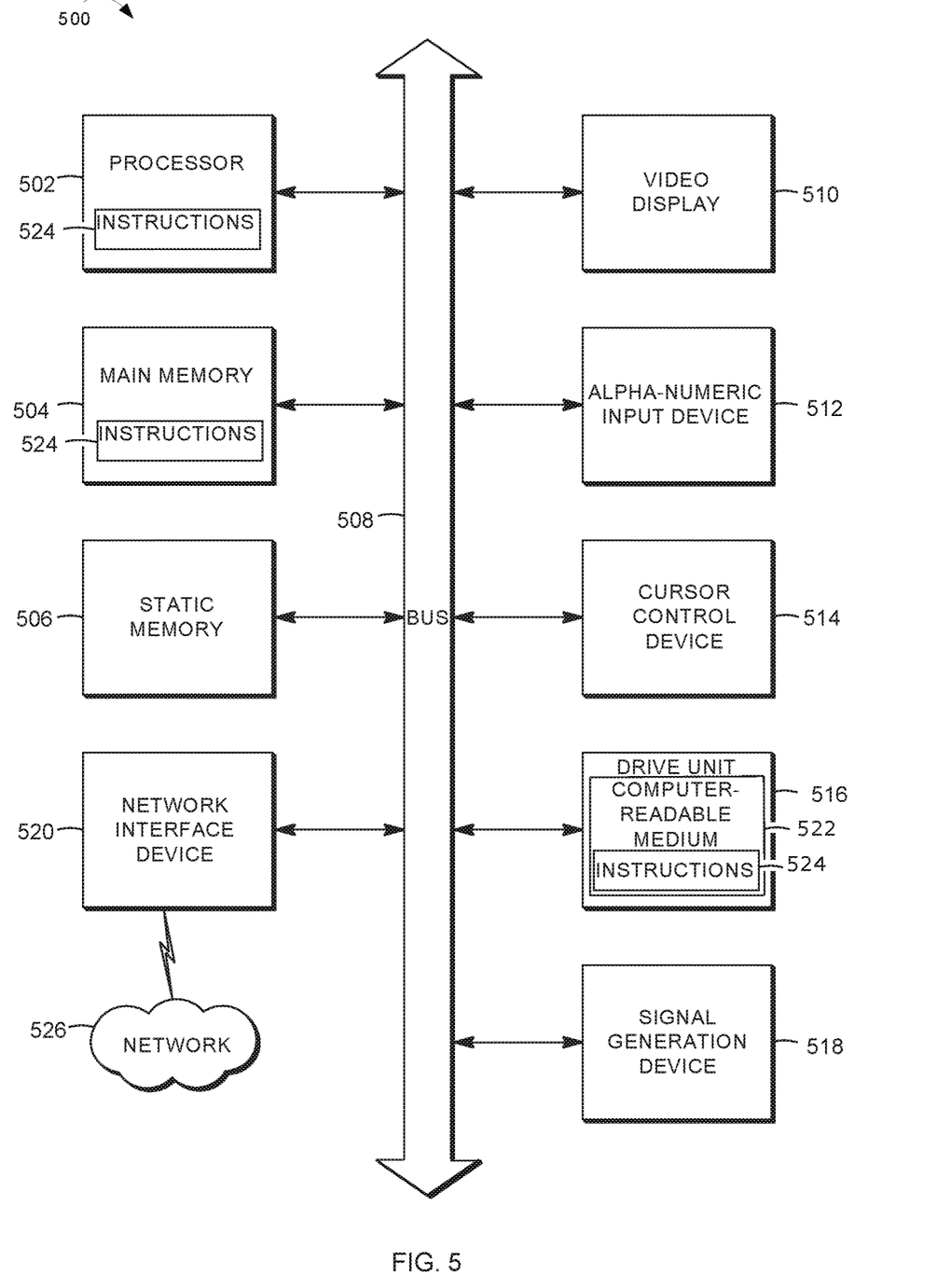
FIG. 5 is a block diagram of an example embodiment of a computer system upon which embodiments of the inventive subject matter can execute.

FIG. 5 is a block diagram of an example embodiment of a computer system 500 upon which embodiments of the inventive subject matter can execute. The description of FIG. 5 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 5 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72 (b) to allow the reader to quickly ascertain the nature and gist of the technical disclosure. The Abstract is submitted with the understanding that it will not be used to limit the scope of the claims.

What is claimed is:

1. A computer-implemented method for determining device proximity, the computer-implemented method comprising the steps of:
    encoding, by a first device, a pairing secret into a displayable code;
    initiating, by a second device, an application for initializing a proximity function;

determining, by the application for initializing the proximity function on the second device, parameters of a camera of the second device;

analyzing, by the application for initializing the proximity function on the second device, parameters of the camera for configuring a rectangle size;

determining, by the application for initializing the proximity function on the second device, the rectangle size according to the parameters of the camera and a position of the second device proximate to the first device determined by the application for initializing the proximity function, wherein the rectangle size (S) is determined according to the equation:

$$S = \frac{f \cdot x \cdot R_y}{D_{ymax}(c-f)},$$

wherein f is a focal point of the camera of the second device, wherein x is a size of the displayable code on the first device, wherein $R_y$ is a y dimension of a display resolution of the display of the second device, wherein $D_{ymax}$ is a y dimension of a sensor chip of the camera of the second device, and wherein c is a threshold distance between the first device and the second device;

displaying, by a display of the second device, the rectangle over an image of the displayable code obtained by the camera, wherein the displayed rectangle has the determined rectangle size;

determining, by the second device, when the displayable code in the image substantially fills the rectangle; and in response to determining that the displayable code in the image substantially fills the rectangle:

decoding, by the second device, the displayable code to determine the pairing secret; and completing a wireless pairing of the first and second devices using the pairing secret.

2. The computer-implemented method of claim 1, wherein the displayable code comprises a Quick Response (QR) code or a barcode.

3. The computer-implemented method of claim 1, wherein the step of determining parameters of the camera includes determining at least one of a focal length, dimensions of a sensor chip, and a display resolution of the camera.

4. The computer-implemented method of claim 1, further comprising the step of:

in response to completing the pairing, storing, by the first device, a signal strength and device identifier data associated with the second device.

5. The computer-implemented method of claim 1, wherein the wireless pairing comprises a Bluetooth pairing.

6. The computer-implemented method of claim 1, wherein the rectangle size is configured based, at least in part, on the parameters of the camera and a predetermined or configurable threshold distance.

7. The computer-implemented method of claim 1, wherein at least one of the first and second devices is a mobile computing device.

8. The computer-implemented method of claim 1, wherein the first device is a source computing device and the second device is a mobile computing device.

9. A non-transitory computer readable storage medium having a program stored thereon, the program causing a computer system to execute the steps of:

initiating an application for initializing a proximity function associated with a camera;

determining parameters of the camera;

analyzing the parameters of the camera for configuring a rectangle size;

determining the rectangle size according to the parameters of the camera and a position of the computer system determined by the application for initializing the proximity function, wherein the rectangle size (S) is determined according to the equation:

$$S = \frac{f \cdot x \cdot R_y}{D_{ymax}(c-f)},$$

wherein f is a focal point of the camera, wherein x is a size of the displayable code, wherein $R_y$ is a y dimension of a display resolution of a display of the second computing device, wherein $D_{ymax}$ is a y dimension of a sensor chip of the camera, and wherein c is a threshold distance between the first and second computing devices;

displaying the rectangle over an image obtained by the camera, wherein the displayed rectangle has the determined rectangle size;

determining when a displayable code in the image substantially fills the rectangle; and in response to determining that the displayable code in the image substantially fills the rectangle:

decoding the displayable code to produce a pairing secret; and completing a wireless pairing of first and second computing devices using the pairing secret.

10. The non-transitory computer readable storage medium of claim 9, wherein the step of determining parameters of the camera includes determining at least one of a focal length, dimensions of a sensor chip, and a display resolution of the camera.

11. The non-transitory computer readable storage medium of claim 9, wherein the rectangle size is configured based, at least in part, on the parameters of the camera and a predetermined or configurable threshold distance.

12. A computer-implemented method for authorizing use of a first device or accessible application thereon, the computer-implemented method comprising the steps of:

encoding, by a first device, a pairing secret into a displayable code;

presenting the displayable code on the first device;

displaying a boundary on a second device, wherein a size of the boundary is determined according to parameters of a camera of the second device and a position of the second device proximate to the first device, wherein the size (S) of the boundary is determined according to the equation:

$$S = \frac{f \cdot x \cdot R_y}{D_{ymax}(c-f)},$$

wherein f is a focal point of the camera, wherein x is a size of the displayable code, wherein $R_y$ is a y dimension of a display resolution of a display of the first device,
wherein $D_{ymax}$ is a y dimension of a sensor chip of the camera, and
wherein c is a threshold distance between the first and second devices;
determining when an image of the displayable code substantially fills an area defined by the boundary;
in response to determining that the displayable code in the image substantially fills the area defined by the boundary:
decoding, by the second device, the displayable code to determine the pairing secret; and
completing a wireless pairing of the first and second devices using the pairing secret.

13. The computer-implemented method of claim 12, further comprising the step of:
in response to completing the pairing of the first and second devices, measuring a first value of a signal strength between the first and second devices.

14. The computer-implemented method of claim 13, further comprising the step of:
saving the first value of the measured signal strength as a threshold value for later use.

15. The computer-implemented method of claim 14, further comprising the steps of:
after the pairing of the first and second devices, measuring a second value of the signal strength between the first and second devices; and
determining when the second value of the signal strength is at least equal to or greater than the threshold value.

16. The computer-implemented method of claim 15, further comprising the step of:
in response to determining that the second value of the signal strength is at least equal to or greater than the threshold value, authorizing use of the first computing device.

* * * * *